US009483544B2

(12) United States Patent
Firat et al.

(10) Patent No.: US 9,483,544 B2
(45) Date of Patent: Nov. 1, 2016

(54) SYSTEMS AND METHODS FOR CALCULATING CATEGORY PROPORTIONS (71) Applicant: Crimson Hexagon, Inc., Boston, MA (US)

(72) Inventors: Aykut Firat, Cambridge, MA (US); Mitchell Brooks, Boston, MA (US); Christopher Bingham, Cambridge, MA (US); Amac Herdagdelen, Mountain View, CA (US); Gary King, Brookline, MA (US)

(73) Assignee: Crimson Hexagon, Inc., Boston, MA (US)

( * ) Notice: Subject to any disclaimer, the term of this patent is extended or adjusted under 35 U.S.C. 154(b) by 87 days.

(21) Appl. No.: 13/804,096

(22) Filed: Mar. 14, 2013

(65) Prior Publication Data

US 2014/0012855 A1    Jan. 9, 2014

Related U.S. Application Data (60) Provisional application No. 61/651,703, filed on May 25, 2012.

(51) Int. Cl.
*G06F 17/30* (2006.01)
*G06Q 50/00* (2012.01)

(52) U.S. Cl.
CPC ... *G06F 17/30598* (2013.01); *G06F 17/30705* (2013.01); *G06Q 50/01* (2013.01); *G06F 2216/03* (2013.01)

(58) Field of Classification Search
CPC .................. G06F 17/30598; G06F 17/30705
See application file for complete search history.

(56) References Cited

U.S. PATENT DOCUMENTS

| 2005/0226495 | A1 | 10/2005 | Li |
| 2009/0030862 | A1 | 1/2009 | King et al. |
| 2009/0125463 | A1 | 5/2009 | Hido |
| 2010/0043001 | A1 | 2/2010 | Stolpe |
| 2010/0164788 | A1 | 7/2010 | Ghaida |

FOREIGN PATENT DOCUMENTS

CN        101187937 A     5/2008

OTHER PUBLICATIONS

Bontempi, Resampling Techniques, 2004, accessed Jan. 19, 2015 at http://web.archive.org/web/20040915111135/http://www.ulb.ac.be/di/map/gbonte/ecares/mod_aver.pdf.*
Bontempi G. (2006) Statistical foundations of machine learning.*
International Search Report and Written Opinion for Application No. PCT/US13/42223, mailed Nov. 26, 2013 (14 pages).
Hopkins et al., Extracting systematic social science meaning from text. Mar. 2008. 41 pages.
Extended European Search Report for Application No. 13794251.2, issued Dec. 22, 2015 (6 pages).
Chinese Office Action for Application No. 201380026232.8, issued Jul. 1, 2016 (26 pages).

* cited by examiner

*Primary Examiner* — William Spieler
(74) *Attorney, Agent, or Firm* — Nutter McClennen & Fish LLP (57) ABSTRACT

Systems and methods are provided for classifying text based on language using one or more computer servers and storage devices. A computer-implemented method includes receiving a training set of elements, each element in the training set being assigned to one of a plurality of categories and having one of a plurality of content profiles associated therewith; receiving a population set of elements, each element in the population set having one of the plurality of content profiles associated therewith; and calculating using at least one of a stacked regression algorithm, a bias formula algorithm, a noise elimination algorithm, and an ensemble method consisting of a plurality of algorithmic methods the results of which are averaged, based on the content profiles associated with and the categories assigned to elements in the training set and the content profiles associated with the elements of the population set, a distribution of elements of the population set over the categories.

11 Claims, 6 Drawing Sheets

SYSTEMS AND METHODS FOR CALCULATING CATEGORY PROPORTIONS

RELATED APPLICATIONS

This application claims priority to U.S. Provisional Application No. 61/651,703, filed May 25, 2012, entitled "Systems and Methods for Calculating Category Proportions," which is incorporated by reference herein.

FIELD

This invention relates to the field of data mining systems. More particularly, it relates to a system and method for estimating the distribution of document content, or conclusions derived from document content, among a set of categories, taking as input data a source of unstructured, structured, or only partially structured source data.

BACKGROUND

Efforts to extract meaning from source data—including documents and files containing text, audio, video, and other communication media—by classifying them into given categories, have a long history. Increases in the amount of digital content, such as web pages, blogs, emails, digitized books and articles, electronic versions of formal government reports and legislative hearings and records, and especially social media such as TWITTER, FACEBOOK, and LINKEDIN posts, gives rise to computational challenges for those who desire to mine such voluminous information sources for useful meaning.

One approach to simplifying this problem is to categorize the content. That is, assign various pieces of content to a number of categories. Conventional techniques for determining the distribution of content across such categories have focused on increasing the percentage of individual elements classified correctly, and techniques for doing so, and then assuming an aggregate proportion of individually classified elements is representative of a distribution in a broader population of unexamined elements. Unfortunately, substantial biases in aggregate proportions such as these can remain even with impressive classification accuracy of individual elements, and the challenge increases with the size and complexity of the data set, leaving these conventional techniques unsuitable for many applications. Accordingly, individual classification of elements of source data—including by automated analysis or hand coding—on a large scale is infeasible.

An improved approach that first evaluates a labeled set of documents having certain content profiles and assigns the documents in the labeled set to categories, then calculates a distribution of documents directly from the content profiles of a population set of documents was disclosed by King et al. in US 2009/0030862 ("System for Estimating a Distribution of Message Content Categories in Source Data," filed on Mar. 19, 2008 and published on Jan. 29, 2009; see, also, Daniel Hopkins and Gary King, "Extracting systematic social science meaning from text," published March 2008, and available at http://gking.harvard.edu/). While this approach has made it possible to analyze large amounts of data, improvements in accuracy when classifying the data can still be made.

SUMMARY

The invention includes systems and methods for calculating category proportions in a population set. In a first aspect, a computer-implemented method is provided. In this aspect, a computer processor receives a training set of elements. Each element in the training set is assigned to one of a plurality of categories and has a content profile associated with it. The computer processor further receives a population set of elements, with each element in the population set having a content profile. The computer process then calculates, applying the stacked regression method, based on the content profiles associated with and the categories assigned to elements in the training set and the content profiles associated with the elements of the population set, a distribution of elements of the population set over the categories.

In a further aspect of the invention, the bias formula method is applied in place of the stacked regression method in the first aspect. In another aspect of the invention, the noise elimination method is applied in place of the stacked regression method in the first aspect. In still another aspect of the invention, an ensemble method consisting of a plurality of algorithmic methods, the results of which are averaged, is applied in place of the stacked regression method in the first aspect.

In a still further aspect of the invention, a system for calculating category proportions for a population set is provided. The system has a training module and a population set category estimating module. The training module includes a training processor coupled to memory with the memory including software instructions causing the training processor to: (i) receive training data, the training data comprising a number of training text elements, (ii) present the at least some of the training text elements to a user, receive from the user an indications of categories to which the training text elements belong, and tag the training text elements with the indicated category, and (iii) store the category tagged training text elements. The population set category estimating module includes an estimating processor coupled to memory, the memory including software instructions causing the estimating processor to: (i) receive population data, the population data comprising a number of population text elements, (ii) calculate a content profile for each category indicated in the training set, (iii) calculate a content profile for the population set, and (iv) calculate, based upon the content profiles associated with the categories indicated for the elements in the training set and the content profile of the population set, the proportions of the population set that belong in each category. In performing its calculation, the population set category estimating module applies at least one of a stacked regression method, a bias formula method, and a noise elimination method.

DETAILED DESCRIPTION OF THE INVENTION

Systems and methods are provided for categorizing structured, unstructured, or partially structured data based on content of the data using one or more computer servers and storage devices. This involves receiving a first set of elements, with each element in the first set being assigned to one of a plurality of categories and having one of a plurality of content profiles associated therewith. A second set of elements is then received, with each element in the second set having one of the content profiles associated therewith. Next, a computer processor calculates, using the algorithms described herein and based on the content profiles associated with and the categories assigned to elements in the first set and the content profiles associated with the elements of the second set, a distribution of elements of the second set over the categories.

The invention can find particular use in social media analytics, where supervised machine learning algorithms are typically used to classify posts into positive, negative, and neutral sentiment. This type of classification can be useful for social media managers who, in an effort to provide customer service or create an online community, seek to interact with those expressing opinions with these sentiments. Additionally, by measuring how the proportions of these sentiment categories change over time, they can gain some insight into the effectiveness of their efforts.

As social media, and correspondingly analysis of social media, is maturing and analysts are asking for complex analyses. The sentiment categories can't provide analysts with the deeper insights they need to make decisions as most business questions do not have answers that can be expressed in terms of generic sentiment. The invention can address these business questions using the advanced algorithms and ensembles of algorithms as disclosed below. Using these techniques, the analysts can define for themselves the categories that are important to their business, and can accurately measure how the proportions of those categories change over time.

Like all supervised machine learning algorithms, the invention can work by building a model of a given dataset using labeled examples of posts in each category. This model is then used to analyze posts that are unlabeled. For most social media analytics tools, this labeling, or "training," is done by engineers. Using the invention, since the analyst defines their own categories, this training can be done by the analyst.

In addition, due to time constraints, analysts can only label a few dozen posts per category when training their model. Relative to the training sets used with conventional algorithms, a training set of this size contains very little information. Additionally, the model trained by the analyst must work effectively even when the unlabeled posts being analyzed have a very different proportion of categories than the trained posts. This is a well known problem in machine learning. When the proportions are imbalanced in this way, any ambiguity in the model will introduce error. Since the small amount of training almost guarantees ambiguity in the model, this combination of small training sets and imbalanced data would appear to be incompatible with accurate classification.

The invention can succeed where traditional algorithms fail because it is not a classifier. It can use an advanced algorithm, or ensemble of algorithms, to analyze posts in aggregate, allowing it to accurately measure category proportions without attempting to classify individual posts. This allows the invention to reveal insights that are relevant to the analyst with a relatively small investment of their time in training the model.

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Computer Processor

Figure 1:
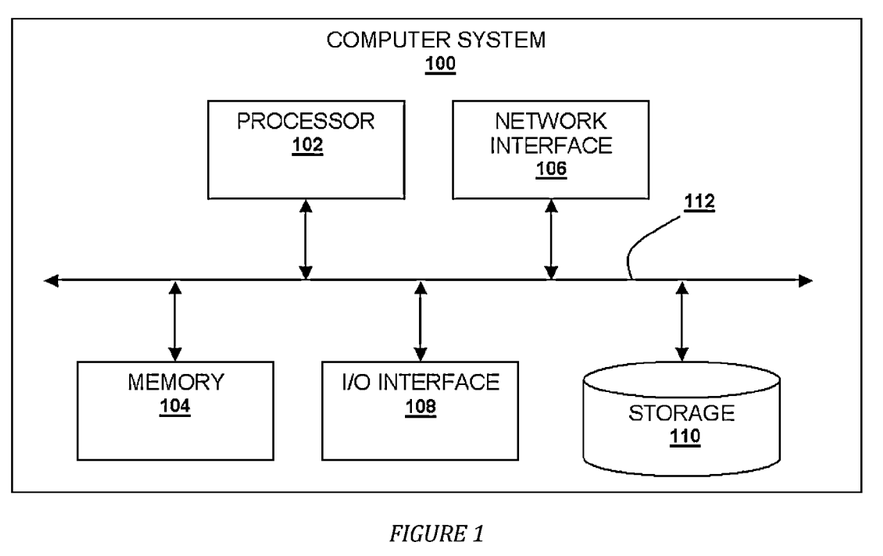
FIG. 1 is a schematic diagram of one exemplary embodiment of a computer system.

The systems and methods disclosed herein can be implemented using one or more computer systems, such as the exemplary embodiment of a computer system 100 shown in FIG. 1. As shown, the computer system 100 can include one or more processors 102 which can control the operation of the computer system 100. The processor(s) 102 can include any type of microprocessor or central processing unit (CPU), including programmable general-purpose or special-purpose microprocessors and/or any one of a variety of proprietary or commercially available single or multi-processor systems. The computer system 100 can also include one or more memories 104, which can provide temporary storage for code to be executed by the processor(s) 102 or for data acquired from one or more users, storage devices, and/or databases. The memory 104 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

The various elements of the computer system 100 can be coupled to a bus system 112. The illustrated bus system 112 is an abstraction that represents any one or more separate physical busses, communication lines/interfaces, and/or multi-drop or point-to-point connections, connected by appropriate bridges, adapters, and/or controllers. The computer system 100 can also include one or more network interface(s) 106, one or more input/output (IO) interface(s) 108, and one or more storage device(s) 110.

The network interface(s) 106 can enable the computer system 100 to communicate with remote devices (e.g., other computer systems) over a network, and can be, for example, remote desktop connection interfaces, Ethernet adapters, and/or other local area network (LAN) adapters. The IO interface(s) 108 can include one or more interface components to connect the computer system 100 with other electronic equipment. For example, the IO interface(s) 108 can include high speed data ports, such as USB ports, 1394 ports, etc. Additionally, the computer system 100 can be accessible to a human user, and thus the IO interface(s) 108 can include displays, speakers, keyboards, pointing devices, and/or various other video, audio, or alphanumeric interfaces. The storage device(s) 110 can include any conventional medium for storing data in a non-volatile and/or non-transient manner. The storage device(s) 110 can thus hold data and/or instructions in a persistent state (i.e., the value is retained despite interruption of power to the computer system 100). The storage device(s) 110 can include one or more hard disk drives, flash drives, USB drives, optical drives, various media cards, and/or any combination thereof and can be directly connected to the computer system 100 or remotely connected thereto, such as over a network. The elements illustrated in FIG. 1 can be some or all of the elements of a single physical machine. In addition, not all of the illustrated elements need to be located on or in the same physical or logical machine. Rather, the illustrated elements can be distributed in nature, e.g., using a server farm or cloud-based technology. Exemplary computer systems include conventional desktop computers, workstations, minicomputers, laptop computers, tablet computers, PDAs, mobile phones, and the like.

Although an exemplary computer system is depicted and described herein, it will be appreciated that this is for sake of generality and convenience. In other embodiments, the computer system may differ in architecture and operation from that shown and described here.

The various functions performed by the computer system 100 can be logically described as being performed by one or more modules. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules is not a signal and can be stored as an executable program on one or more non-transitory computer-readable storage mediums. Functions disclosed herein as being performed by a particular module can also be performed by any other module or combination of modules.

Exemplary Architecture

Figure 2:
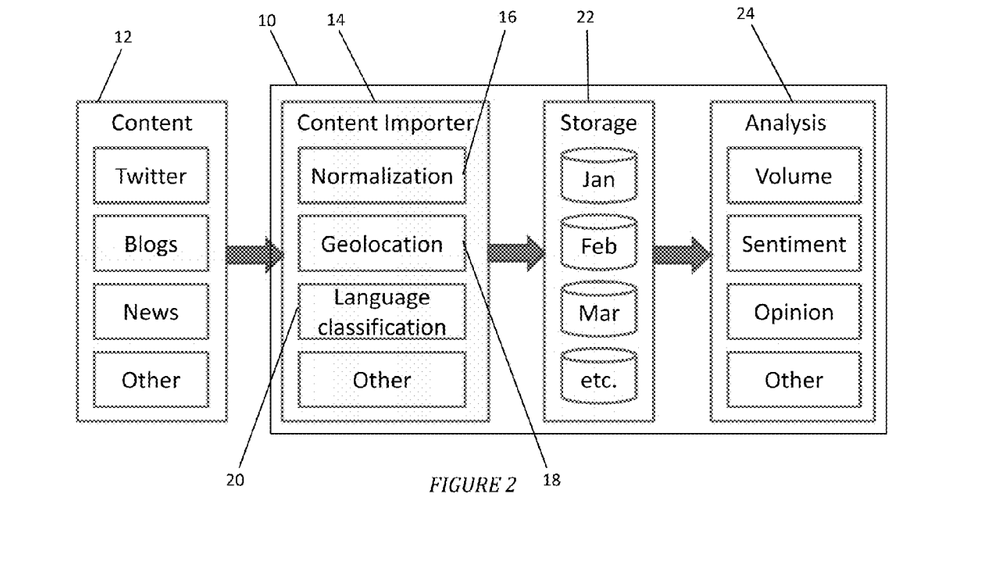
FIG. 2 is an architectural diagram of a system of the invention.

An exemplary system 10 for carrying out the invention is disclosed in FIG. 2. Here, content 12, such as social media content, and as specifically illustrated, content from TWITTER, blogs, news, and other social media or other content can be imported into system 10. Individual content items are sometimes referred to herein as "documents" or "posts." In general, these posts are text inputs—that is, they include unstructured data. However, the invention can be applied just as well to structured data, such as data stored in spreadsheets or databases in a structured format, or to combinations of structured and unstructured data. A Content Importer 14 receives the documents and prepares them for analysis. In one exemplary pre-analysis step, the documents can be Normalized 16. Normalization 16 can include converting all the documents from diverse sources to a standardized set of fields, like contents, date, author, title, etc. Each data providers may have different names for its fields, or different ways of formatting the data. The goal of normalization is to store everything in a consistent way (the "normal" form) so that analysis can be performed on the documents without regard to their origin. Normalization could also include things like removing duplicates, removing posts that are spam or have bogus URLs, converting all dates to GMT, etc. The Content Importer can also tag posts with Geolocation 18 data. That is, where possible, the Content Importer can estimate, based on things like language, IP addresses, tags, or the post actually containing geolocation references, a location for the post and can tag the post with that location. In this way, analysis can also be geo-specific, so that analysis can be performed based on relevant geographical regions. Further, the Import Server can apply a Language Classifier 20 that can determine a language for a given post and tag the post with that language.

As with location, this allows later analysis to be segregated based upon language. In addition, other types of pre-analysis may be performed on the content prior to storage for analysis according to the invention.

System 10 can also include computer storage 22 that stores imported content for analysis. In one embodiment, the content can be stored according to the time of its generation (illustrated in FIG. 2 as being stored according to month). Where the circumstances are such that the analysis is often date specific, arranging the content in storage according to date can allow for convenient and efficient retrieval of the content for analysis.

System 10 also includes an Analysis section 24. It is in the analysis section that the algorithms described below are employed to analyze content. The analysis can include a volume analysis—such as how much content references the IPHONE 5. The analysis can further include a sentiment analysis—such as whether posters like or dislike the IPHONE 5. The analysis preferably includes poster opinion based upon categories selected by an analyst. The analysis section can include other types of analysis as well.

Figure 3:
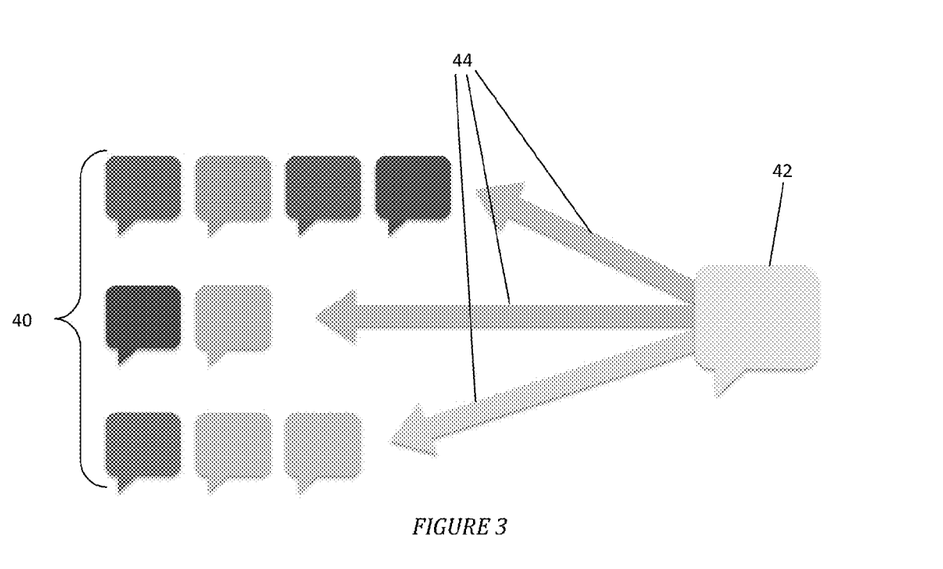
FIG. 3 illustrates the sorting of a training set into categories according to the invention.

System 10 can operate by first presenting a number of sampled posts 40 to a human user 42 as illustrated in FIG. 3. The human user sorts the posts into user-defined categories 44—shown in FIG. 3 as three categories, though any number of categories could be used. The collection of posts that is categorized by a human user can be referred to as a training set. The remaining posts, those that will be analyzed by the system, can be referred to as a population set.

Figure 4A:
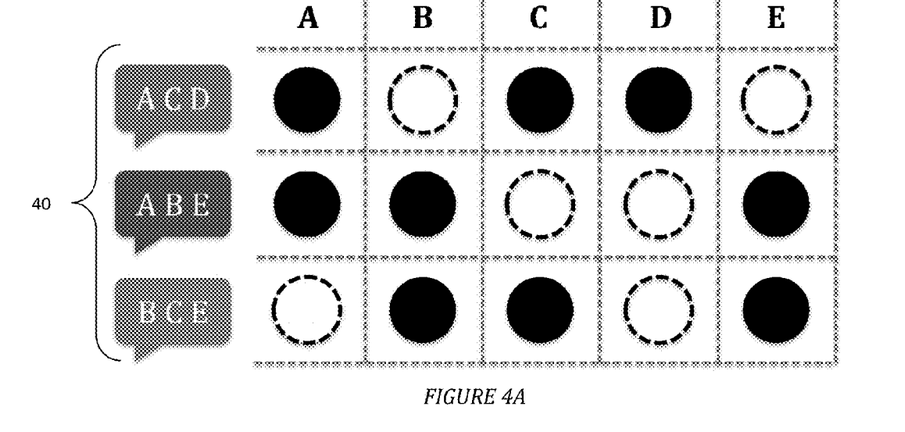
FIGS. 4A and 4B illustrate the creation of content profiles for documents according to the invention.
Figure 4B:
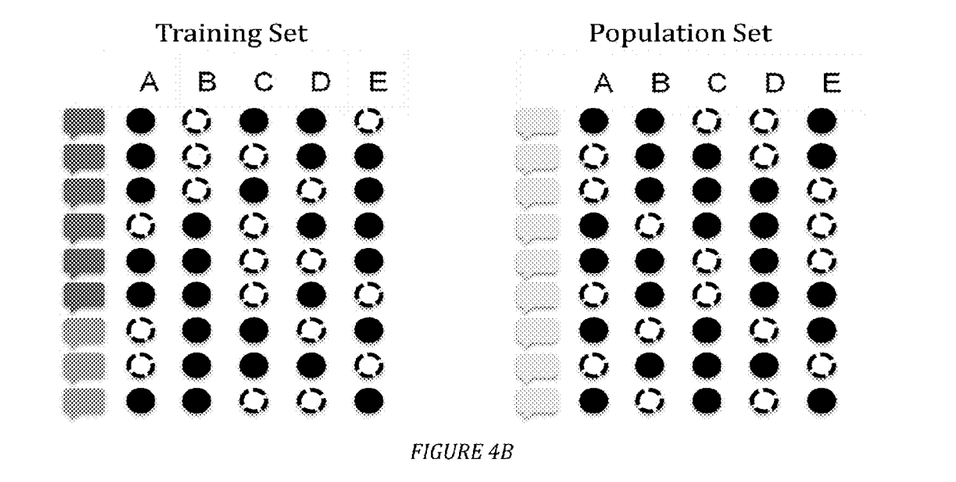

Next, as illustrated in FIG. 4A, a content profile can be created for each post. The profile can indicate the presence or absence of a feature, where the feature could be letters, symbols, words, word roots, or combinations of any of those things. In preferred embodiments, the profile indicates the presence or absence of a word or word root. As shown in the first post 40 in FIG. 4A, the post contains A, C, and D. Accordingly, in the chart, A, C, and D are indicated to be present in that post, while B and E are absent. Other posts 40 have other combinations. In a more concrete example, a TWITTER post could be analyzed to indicate the presence or absence of a set of word roots. This content profile for the post could then be used in the further analysis described below. As indicated in FIG. 4B, at the conclusion of this portion of the analysis, each document in the training set and in the population set has a profile.

Figure 5A:
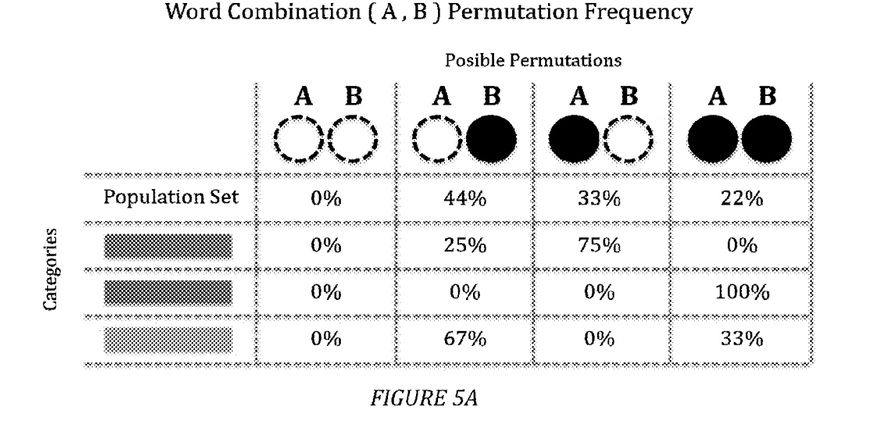
FIGS. 5A and 5B illustrate the creation of content profiles for a population set and categories according to the invention.
Figure 5B:
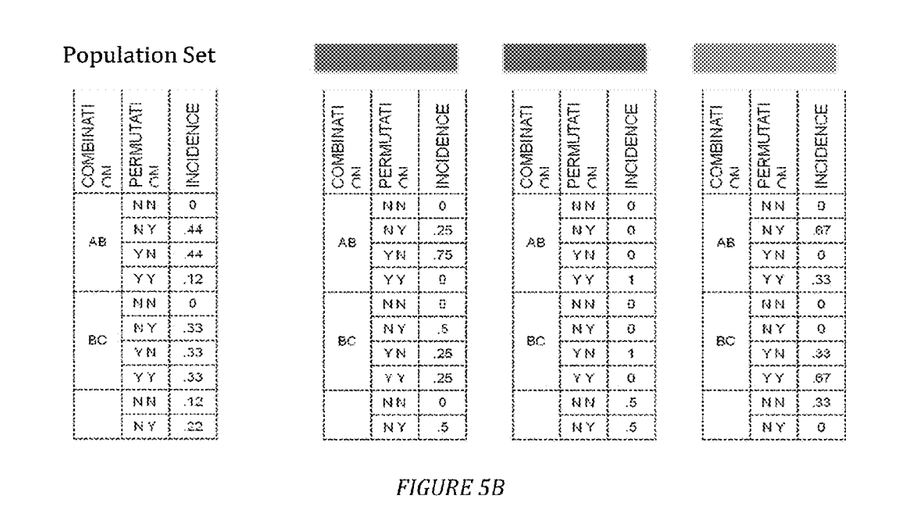

Turning now to FIG. 5A, the analysis algorithm chooses a random feature combination, such as a word or word root combination, and measures the frequency of its permutations in the population set, and in each category of the training set. This process is then repeated, as illustrated in FIG. 5B, for a variety of word combinations and permutations. The combined incidences of these permutations results in a unique content profile for the population set and each category.

Figure 6:
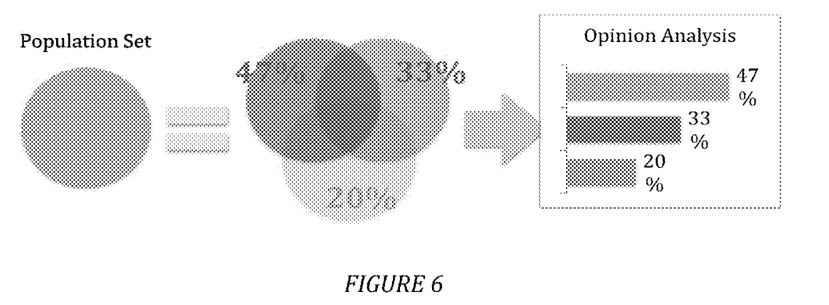
FIG. 6 illustrates a solution for category proportions across the population set according to the invention.

Now, having content profiles for the population set and each category, the algorithm can solve for the category proportions that, when combined, produce a content profile that is close to that of the population set. The result, illustrated by example in FIG. 6, provides the percentage of posts that fall within each category without having to analyze each individual post.

Analysis Module/Algorithms

Algorithms useful in the system and methods illustrated above will now be described. In the first instance, algorithms described in King et al. U.S. published patent application no. 2009/0030862 may be employed with the system, especially where an ensemble of different algorithms are used as described below. However, the present inventors have created algorithms that can provide highly accurate results in a wide variety of conditions that may be preferably applied to the system and method described above.

The problem requiring analysis, as noted above, is the quantifying into opinion category proportions of a text corpus over time. Users define opinion category proportions by providing example documents for each category during training (the training set). Two conventional solutions for quantifying the category proportions will now be described for the purpose of illustrating the problem in the state of the art. The first conventional solution is regression-based and operates as follows:

First, both the text documents labeled during training and those that are to be quantified are turned into a term-document matrix, in which the rows correspond to documents, columns to terms, and cells to the presence or lack of terms in the documents, as illustrated, for example, in FIGS. 4A and 4B. The term-document matrix can further be transformed into word-profile distributions by randomly sampling a set of words and calculating word-profile frequencies of all existing permutations as illustrated, for example, in FIGS. 5A and 5B.

Let X=P(S/D) be the word-profile distributions given an opinion category constructed from the training examples and Y=P(S) be the word-profile distributions in the documents to be quantified. Quantifying the category proportions, β=P(D), then is reduced to the task of solving the following equation:

$$Y = X\beta$$

When the independent variable X is measured without any error, the solution of this equation can be achieved through classical multi-regression. In our problem, independent variables are measured via sampling, thus containing sampling errors, and classical regression approaches cannot be employed to produce unbiased results.

This bias can be quantified by employing the following modeling approach:

In the test or population set we have Y=Xβ, and in the training-set we have: Y*=X*β*. Both X and X* come from the same category-specific word-profile distribution, but their distributions vary based on the sample sizes and can be modeled with normal approximation as follows:

$$X_{jk} \sim P_{jk} + u_{jk}, \text{ where } u_{jk} \sim N(0, P_{jk}(1-P_{jk})/N_k)$$

$$X^*_{jk} \sim P_{jk} + e_{jk}, \text{ where } e_{jk} \sim N(0, P_{jk}(1-P_{jk})/n_k)$$

With some simplifying assumptions, the classical multi-regression solution, β̂, can be shown to have a bias component that is a function of the true category proportions β:

$$\hat{\beta} = \beta - (P'P + \Sigma_F)^{-1} \Sigma_F \beta \quad (1)$$

Briefly, when there are errors in the independent variables, the regression procedure is known to produce biased results. Because the independent variables here, which come from a transformation of the training set, are obtained through sampling, they do contain errors. This, the present inventors believe, while not wishing to be bound to any particular theory of the invention, causes error. This problem is referred to herein as "the error in variables."

The second conventional solution is based on applying classification algorithms to the corpus of interest (test) using the labeled examples (training), and constructing a histogram by simply counting the predicted classification labels.

A fundamental problem with this approach is that the accuracy of classification algorithms depends substantially on whether the training and test documents have the same distribution or not. The classification algorithms introduce bias when test and training distributions are different. However, test and training distributions are expected to differ substantially; therefore we cannot use the classification based histogram approaches.

In one aspect, the invention includes an ensemble type solution that uses the average of a number of different methods to estimate the category proportions. In this aspect, any number of methods greater than one can be used and averaged—in one embodiment, five methods for estimating the category proportions are used and averaged. The Methods selected can include those described in the King et al. published patent application referenced above, the methods described below, or other methods not disclosed herein or in King et al.

In a further aspect, the invention includes at least one of three novel methods for estimating category proportions. The first of the three methods is referred to as a "Stacked Regression" method. The Stacked Regression is a variation of the regression method described above. The second of the three methods is referred to as a "Bias Formula" method and it uses the Stacked Regression as an input. The third of the three methods is referred to as a "Noise Elimination" method. The invention may include the application of one of these methods to estimate category proportions, or any one or more than one can be used or combined with other methods in the ensemble approach.

Any of these methods can be implemented in software on a computer system, for example, using modules as described above.

Stacked Regression:

In prior regression based methods, term-document matrix to word-profile transformation is performed one at a time with a small number of resulting data rows. To compensate for the low number of data rows in each regression, several hundred regressions are done and averaged.

An alternative approach is to "stack" the data used in several hundred regressions and instead run a single regression using all data rows at the same time. Mathematically, doing only stacking would not remove the bias, as the least squares estimate is an inconsistent estimate when there are errors in variables. We couple the stacked approach with weighted regression, where the weight for each data row is the inverse of its estimated total variance as shown below.

$$W = \text{diag}\left(\frac{\sum_k (P_{jk}(1-P_{jk}))}{n_k}\right)^{-1}$$

By using the weights we are able to contain the influence of high variance rows and thus reduce the expected bias.

Bias Formula:

We derived a bias formula using statistical approximations that is used to estimate the true category proportions from a naïve estimate. Bias correction uses the following equation to adjust the naïve least squares estimate β̂.

$$\beta = (I - A'(AX'XA' + AE'EA')^{-1}AE'E)^{-1}\hat{\beta}$$

where A is obtained as follows (in R-like notation) using gram-schmidt ortho-normalization:

$$G = \text{diag}(1, k)$$

$$G[1,] = \text{rep}(1/k, k)$$

$$G = \text{gram.schmidt}(G, \text{orthnorm} = 2:k)$$

$$A = G[2:k,]$$

$$E'E = \text{diag}\left(\frac{\sum_j (P_{jk}(1-P_{jk}))}{n_k}\right) \approx \text{diag}\left(\frac{\sum_j (X^*_{jk}(1-X^*_{jk}))}{n_k - 1}\right)$$

Noise Elimination:

In our problem, both $Y = X\beta$ (test) and $Z = X^*\beta$ (training) (for any given $\beta$ and the random variables of test and training distributions $X$ and $X^*$ respectively), can be considered as random variables with the same mean but different variances. If we model the noise in test and training sets using normal approximation, we have:

$$X_{jk} \sim P_{jk} + u_{jk}, \text{ where } u_{jk} \sim N(0, P_{jk}(1-P_{jk})/N_k)$$

$$X^*_{jk} \sim P_{jk} + e_{jk}, \text{ where } e_{jk} \sim N(0, P_{jk}(1-P_{jk})/n_k)$$

Let us define the difference of Y and $X^*\beta$ as another random variable: $\theta = (Y-Z) = (X-X^*)\beta$.

This new random variable is purely noise, a result of using different sample sizes in the test and training data, and we want to subtract the expected value of this noise (squared) from our sum of squared error calculations. More specifically, we want to find the $\hat{\beta}$ that is a solution to the following minimization problem (Note that bolded variables are random variables and plain variables are observed values of these random variables in the test and training):

$$\min f(\beta) = (Y - X^*\hat{\beta})(Y - X^*\hat{\beta}) - E((Y - X^*\hat{\beta})(Y - X^*\hat{\beta}))/s.$$
$$t. \Sigma \hat{\beta} = 1$$

An estimate of $E((Y-X^*\hat{\beta})'(Y-X^*\hat{\beta}))$ is derived to be:

$$\sum_{j=1}^{M} E(\theta_j^2) = E\left(\sum_{j=1}^{M}\sum_{k=1}^{K} X^*_{jk}(1-X^*_{jk})\left(\frac{\beta_k}{N} + \frac{\beta_k^2}{n_k}\right)\left(\frac{n_k}{n_k - 1}\right)\right)$$

This means that the expected value of the sum of squared errors can be estimated using our best estimate of the $P_{jk}$ as follows:

$$\sum_{j=1}^{M}\sum_{k=1}^{K} P_{jk}(1-P_{jk}) * \left(\frac{\beta_k}{N} + \frac{\beta_k^2}{n_k}\right)$$

The numerical procedure we currently perform to solve the optimization procedure is as follows:
1) Generate some estimate of the true $\beta$, i.e., $\beta_0$.
2) Generate 5000 Dirichlet variables with alpha=$25*\beta_0$
3) Calculate $f(\hat{\beta})$ for each of the 5000 $\hat{\beta}$ values, and order them in ascending order.
4) Average the top 100 $\hat{\beta}$ values from Step 3.

A person of ordinary skill in the art will appreciate further features and advantages of the invention based on the above-described embodiments and objectives. Accordingly, the invention is not to be limited by what has been particularly shown and described, except as indicated by the appended claims or those ultimately provided. All publications and references cited herein are expressly incorporated herein by reference in their entirety, and the invention expressly includes all combinations and sub-combinations of features included above and in the incorporated references.

What is claimed is:

1. A computer-implemented method for categorizing digital documents, containing digital content, in aggregate, the method performed by a computer processor and comprising:
   (a) receiving by the computer processor a training set of digital documents each containing digital content, each digital document in the training set being assigned to one of a plurality of categories and being associated with one of a plurality of content profiles, each content profile representing existence or absence of one or more features in the digital content of the digital document;
   (b) receiving by the computer processor a population set of digital documents each containing digital content, each digital document in the population set having one of the plurality of content profiles associated with the digital content contained therein;
   (c) organizing the digital documents of the training set and the digital documents of the population set into a matrix using the plurality of content profiles, the matrix having rows corresponding to each of the digital documents and cells indicating existence or absence of the one or more features in the digital content of the digital document;
   (d) determining a weight for each row of the matrix using an estimated total variance for that row of the matrix;
   (e) determining, by the computer processor applying a stacked regression coupled with weighted regression to the matrix, the weighted regression using the weights determined for the rows of the matrix, a proportion of the digital documents in the population set belonging to each category of the plurality of categories;
   (f) determining one or more category proportions of the digital documents, each including the portion of the digital documents belonging each category; and
   (g) categorizing the digital documents by labeling the digital document based on the category corresponding to the proportion to which the digital document belongs.

2. A computer-implemented method for categorizing digital documents, containing digital content, in aggregate, the method performed by a computer processor and comprising:
   (a) receiving by the computer processor a training set of digital documents, digital document in the training set being assigned to one of a plurality of categories and being associated with one of a plurality of content profiles representing existence or absence of one or more features therein;
   (b) receiving by the computer processor a population set of digital documents, each digital document in the population set having one of the plurality of content profiles associated therewith;
   (c) determining, by the computer processor applying a bias formula method based on the content profiles associated with and the categories assigned to the digital documents in the training set and the content profiles associated with the digital documents of the population set, the proportion of the digital documents in the population set belonging to each category of the plurality of categories;
   (d) determining one or more category proportions of the digital documents, each including the portion of the digital documents belonging each category; and (e) categorizing the digital documents by labeling the digital document based on the category corresponding to the proportion to which the digital document belongs.

3. A computer-implemented method for categorizing digital documents, containing digital content, in aggregate, the method performed by a computer processor and comprising:
   (a) receiving by the computer processor a training set of digital documents, each digital document in the training set being assigned to one of a plurality of categories and being associated with one of a plurality of content profiles representing existence or absence of one or more features therein;
   (b) receiving by the computer processor a population set of digital documents, each digital document in the population set having one of the plurality of content profiles associated therewith; and
   (c) determining, by the computer processor applying a noise elimination method based on the content profiles associated with and the categories assigned to the digital documents in the training set and the content profiles associated with the digital documents of the population set, the proportion of the digital documents in the population set belonging to each category of the plurality of categories;
   (d) determining one or more category proportions of the digital documents, each including the portion of the digital documents belonging each category; and
   (e) categorizing the digital documents by labeling the digital document based on the category corresponding to the proportion to which the digital document belongs.

4. A computer-implemented method for categorizing digital documents, containing digital content, in aggregate, the method performed by a computer processor and comprising:
   (a) receiving by the computer processor a training set of digital documents, each digital document in the training set being assigned to one of a plurality of categories and being associated with one of a plurality of content profiles representing existence or absence of one or more features therein;
   (b) receiving by the computer processor a population set of digital documents, each digital document in the population set having one of the plurality of content profiles associated therewith;
   (c) calculating, by a computer processor ensemble method consisting of a plurality of algorithmic methods the results of which are averaged, the ensemble including a bias formula method, based on the content profiles associated with and the categories assigned to the digital documents in the training set and the content profiles associated with the digital documents of the population set, the proportion of the digital documents in the population set belonging to each category of the plurality of categories;
   (d) determining one or more category proportions of the digital documents, each including the portion of the digital documents belonging each category; and
   (e) categorizing the digital documents by labeling the digital document based on the category corresponding to the proportion to which the digital document belongs.

5. The computer-implemented method of claim 4, wherein the ensemble includes a stacked regression method coupled with weighted regression.

6. The computer-implemented method of claim 4, wherein the ensemble includes a noise elimination method.

7. A system for calculating category proportions for a population set of digital documents containing digital content, the system comprising:
   a training module comprising a training processor coupled to a memory, the memory including software instructions causing the training processor to:
   receive training data, the training data comprising a number of training text elements;
   present the at least some of the training text elements to a user, receive from the user an indications of categories to which the training text elements belong, and tag the training text elements with the indicated category; and
      store the category tagged training text elements; and
      a population set category estimating module comprising an estimating processor coupled to memory, the memory including software instructions causing the estimating processor to:
   receive population data, the population data comprising a number of population text elements;
   calculate a content profile for each category indicated in the training set;
   calculate a content profile for the population set;
   calculate a matrix having cells indicating existence or absence of one or more features in the text elements;
   calculate, based upon the content profiles associated with the categories indicated for the elements in the training set and the content profile of the population set, the proportions of the population set that belong in each category;
   determine one or more category proportions of the digital documents, each including the portion of the digital documents belonging each category; and
   categorize the digital documents by labeling the digital document based on the category corresponding to the proportion to which the digital document belongs;
   wherein calculating the proportions includes applying at least one of a stacked regression method coupled with weighted regression that uses weights determined for rows of the matrix, a bias formula method, and a noise elimination method.

8. The system of claim 7, wherein calculating the proportions includes applying a plurality of calculating methods in an ensemble and averaging the results of the different methods.

9. The system of claim 7, wherein calculating the proportions includes the stacked regression method.

10. The system of claim 7, wherein calculating the proportions includes the bias formula method.

11. The system of claim 7, wherein calculating the proportions includes applying the noise elimination method.

* * * * *